(12) United States Patent
Le et al.

(10) Patent No.: US 8,575,779 B2
(45) Date of Patent: Nov. 5, 2013

(54) FERRORESONANT TRANSFORMER FOR USE IN UNINTERRUPTIBLE POWER SUPPLIES

(75) Inventors: Thanh Le, Ferndale, WA (US); James Richardson, Bellingham, WA (US); Litcho Datzov, Bellingham, WA (US)

(73) Assignee: Alpha Technologies Inc., Bellingham, WA (US)

( * ) Notice: Subject to any disclaimer, the term of this patent is extended or adjusted under 35 U.S.C. 154(b) by 429 days.

(21) Appl. No.: 12/803,787

(22) Filed: Jul. 7, 2010

(65) Prior Publication Data

US 2011/0198932 A1 Aug. 18, 2011

Related U.S. Application Data

(60) Provisional application No. 61/305,926, filed on Feb. 18, 2010.

(51) Int. Cl.
*H02J 9/00* (2006.01)

(52) U.S. Cl.
USPC .................... 307/66; 307/23; 307/82; 307/87

(58) Field of Classification Search
USPC ..................................... 307/65, 66
See application file for complete search history.

(56) References Cited

U.S. PATENT DOCUMENTS

| | | |
|---|---|---|
| 352,105 A | 11/1886 | Zipernowsky et al. |
| 375,614 A | 12/1887 | Eickemeyer |
| 414,266 A | 11/1889 | Thomson |
| 1,718,238 A | 6/1929 | Kettering et al. |
| 1,950,396 A | 3/1934 | Boucher |
| 2,007,415 A | 7/1935 | Walker |

(Continued)

FOREIGN PATENT DOCUMENTS

| | | |
|---|---|---|
| CA | 2033685 | 10/1991 |
| CA | 2036296 | 11/1991 |

(Continued)

OTHER PUBLICATIONS

International Searching Authority, PCT Notification of Transmittal of the International Search Report and the Written Opinion of the International Searching Authority, or the Declaration, Oct. 26, 2011, 9 pages.

(Continued)

*Primary Examiner* — Rexford Barnie
*Assistant Examiner* — Toan Vu
(74) *Attorney, Agent, or Firm* — Michael R. Schacht; Schacht Law Office, Inc.

(57) ABSTRACT

A ferroresonant transformer comprises a core, a main shunt, first windings, second windings, and third windings. The main shunt arranged relative to the core to define a primary side and a secondary side of the ferroresonant transformer. The first windings are arranged on the primary side of the ferroresonant transformer and are operatively connected to the primary power source. The second windings are arranged on the secondary side of the ferroresonant transformer and are operatively connected to the secondary power source. The third windings are arranged on the secondary side of the ferroresonant transformer and are operatively connected to the resonant capacitor. When a primary signal is present on the first windings, a first output signal is present on at least a portion of the third windings. When a secondary power is present on the second windings, a second output signal is present on at least a portion of the third windings.

14 Claims, 3 Drawing Sheets

(56) References Cited

U.S. PATENT DOCUMENTS

| | | | |
|---|---|---|---|
| 2,014,101 A | 9/1935 | Bryan | |
| 2,037,183 A | 4/1936 | Strieby | |
| 2,036,994 A | 12/1936 | Frank et al. | |
| 2,085,072 A | 6/1937 | Bobe | |
| 2,165,969 A | 7/1939 | Humbert et al. | |
| 2,240,123 A | 4/1941 | Shoup et al. | |
| 2,302,192 A | 11/1942 | Dannheiser | |
| 2,352,073 A | 6/1944 | Boucher et al. | |
| 2,427,678 A | 9/1947 | Laging | |
| 2,444,794 A | 7/1948 | Uttal et al. | |
| 2,512,976 A | 6/1950 | Smeltzly | |
| 2,688,704 A | 9/1954 | Christenson | |
| 2,856,543 A | 10/1958 | Dixon et al. | |
| 2,920,211 A | 1/1960 | Gotoh | |
| 2,996,656 A | 8/1961 | Sola | |
| 3,022,458 A | 2/1962 | Sola | |
| 3,064,195 A | 11/1962 | Freen | |
| 3,221,172 A | 11/1965 | Rolison | |
| 3,283,165 A | 11/1966 | Bloch | |
| 3,293,445 A | 12/1966 | Levy | |
| 3,304,599 A | 2/1967 | Nordin | |
| 3,305,762 A | 2/1967 | Gelb, Jr. | |
| 3,339,080 A | 8/1967 | Howald | |
| 3,345,517 A | 10/1967 | Smith | |
| 3,348,060 A | 10/1967 | Jamieson | |
| 3,389,329 A | 6/1968 | Quirk et al. | |
| 3,435,358 A | 3/1969 | Rheinfelder | |
| 3,458,710 A | 7/1969 | Dodge | |
| 3,521,152 A | 7/1970 | Emerson | |
| 3,525,035 A | 8/1970 | Kakalec | |
| 3,525,078 A | 8/1970 | Baggott | |
| 3,546,571 A | 12/1970 | Fletcher et al. | |
| 3,590,362 A | 6/1971 | Kakalec | |
| 3,636,368 A | 1/1972 | Sia | |
| 3,678,284 A | 7/1972 | Peters | |
| 3,678,377 A | 7/1972 | Chiffert | |
| 3,686,561 A | 8/1972 | Spreadbury | |
| 3,691,393 A | 9/1972 | Papachristou | |
| 3,742,251 A | 6/1973 | Thompson et al. | |
| 3,823,358 A | 7/1974 | Rey | |
| 3,859,589 A | 1/1975 | Rush | |
| 3,860,748 A | 1/1975 | Everhart et al. | |
| 3,873,846 A | 3/1975 | Morio et al. | |
| 3,909,560 A | 9/1975 | Martin et al. | |
| 3,916,295 A | 10/1975 | Hunter | |
| 3,938,033 A | 2/1976 | Borkovitz et al. | |
| 3,943,447 A | 3/1976 | Shomo | |
| 4,004,110 A | 1/1977 | Whyte | |
| 4,010,381 A * | 3/1977 | Fickenscher et al. | 307/66 |
| 4,122,382 A | 10/1978 | Bernstein | |
| 4,130,790 A | 12/1978 | Heisey | |
| 4,170,761 A | 10/1979 | Koppehele | |
| 4,217,533 A | 8/1980 | Van Beek | |
| 4,251,736 A | 2/1981 | Coleman | |
| 4,262,245 A | 4/1981 | Wendt | |
| 4,270,080 A | 5/1981 | Kostecki | |
| 4,277,692 A | 7/1981 | Small | |
| 4,313,060 A | 1/1982 | Fickenscher et al. | |
| 4,353,014 A | 10/1982 | Willis | |
| 4,366,389 A | 12/1982 | Hussey | |
| 4,366,390 A | 12/1982 | Rathmann | |
| 4,385,263 A | 5/1983 | Luz et al. | |
| 4,400,624 A | 8/1983 | Ebert, Jr. | |
| 4,400,625 A | 8/1983 | Hussey | |
| 4,423,379 A | 12/1983 | Jacobs et al. | |
| 4,460,834 A | 7/1984 | Gottfried | |
| 4,466,041 A | 8/1984 | Witulski et al. | |
| 4,472,641 A | 9/1984 | Dickey et al. | |
| 4,475,047 A | 10/1984 | Ebert, Jr. | |
| 4,510,401 A | 4/1985 | Legoult | |
| 4,604,530 A | 8/1986 | Shibuya | |
| 4,616,305 A | 10/1986 | Damiano et al. | |
| 4,631,471 A * | 12/1986 | Fouad et al. | 323/306 |
| 4,656,412 A | 4/1987 | McLyman | |
| 4,670,702 A | 6/1987 | Yamada et al. | |
| 4,673,825 A | 6/1987 | Raddi et al. | |
| 4,686,375 A | 8/1987 | Gottfried | |
| 4,697,134 A | 9/1987 | Burkum et al. | |
| 4,700,122 A | 10/1987 | Cimino et al. | |
| 4,709,318 A | 11/1987 | Gephart et al. | |
| 4,719,427 A | 1/1988 | Morishita et al. | |
| 4,719,550 A | 1/1988 | Powell et al. | |
| 4,724,290 A | 2/1988 | Campbell | |
| 4,724,478 A | 2/1988 | Masuko et al. | |
| 4,740,739 A | 4/1988 | Quammen et al. | |
| 4,745,299 A | 5/1988 | Eng et al. | |
| 4,748,341 A * | 5/1988 | Gupta | 307/64 |
| 4,748,342 A | 5/1988 | Dijkmans | |
| 4,763,014 A | 8/1988 | Model et al. | |
| 4,775,800 A | 10/1988 | Wood | |
| 4,791,542 A | 12/1988 | Piaskowski | |
| 4,829,225 A | 5/1989 | Podrazhansky et al. | |
| 4,860,185 A | 8/1989 | Brewer et al. | |
| 4,882,717 A | 11/1989 | Hayakawa et al. | |
| 4,890,213 A | 12/1989 | Seki | |
| 4,916,329 A | 4/1990 | Dang et al. | |
| 4,920,475 A | 4/1990 | Rippel | |
| 4,926,084 A | 5/1990 | Furutsu et al. | |
| 4,943,763 A | 7/1990 | Bobry | |
| 4,952,834 A | 8/1990 | Okada | |
| 4,954,741 A | 9/1990 | Furutsu et al. | |
| 4,975,649 A | 12/1990 | Bobry | |
| 4,988,283 A | 1/1991 | Nagasawa et al. | |
| 5,010,469 A | 4/1991 | Bobry | |
| 5,017,800 A | 5/1991 | Divan | |
| 5,029,285 A | 7/1991 | Bobry | |
| 5,057,698 A | 10/1991 | Widener et al. | |
| 5,137,020 A | 8/1992 | Wayne et al. | |
| 5,148,043 A | 9/1992 | Hirata et al. | |
| 5,154,986 A | 10/1992 | Takechi et al. | |
| 5,168,205 A | 12/1992 | Kan et al. | |
| 5,172,009 A | 12/1992 | Mohan | |
| 5,185,536 A | 2/1993 | Johnson, Jr. et al. | |
| 5,193,067 A | 3/1993 | Sato et al. | |
| 5,198,698 A | 3/1993 | Paul et al. | |
| 5,198,970 A | 3/1993 | Kawabata et al. | |
| 5,200,643 A | 4/1993 | Brown | |
| 5,229,650 A | 7/1993 | Kita et al. | |
| 5,237,208 A | 8/1993 | Tominaga et al. | |
| 5,281,919 A | 1/1994 | Palanisamy | |
| 5,302,858 A | 4/1994 | Folts | |
| 5,400,005 A | 3/1995 | Bobry | |
| 5,410,720 A | 4/1995 | Osterman | |
| 5,440,179 A | 8/1995 | Severinsky | |
| 5,457,377 A | 10/1995 | Jonsson | |
| 5,483,463 A | 1/1996 | Qin et al. | |
| 5,532,525 A | 7/1996 | Kaiser et al. | |
| 5,579,197 A | 11/1996 | Mengelt et al. | |
| 5,602,462 A | 2/1997 | Stich et al. | |
| 5,610,451 A | 3/1997 | Symonds | |
| 5,635,773 A | 6/1997 | Stuart | |
| 5,638,244 A | 6/1997 | Mekanik et al. | |
| 5,642,002 A | 6/1997 | Mekanik et al. | |
| 5,739,595 A | 4/1998 | Mekanik et al. | |
| 5,745,356 A | 4/1998 | Tassitino, Jr. et al. | |
| 5,747,887 A | 5/1998 | Takanaga et al. | |
| 5,747,888 A | 5/1998 | Zilberberg | |
| 5,760,495 A | 6/1998 | Mekanik | |
| 5,768,117 A | 6/1998 | Takahashi et al. | |
| 5,783,932 A | 7/1998 | Namba et al. | |
| 5,790,391 A | 8/1998 | Stich et al. | |
| 5,844,327 A | 12/1998 | Batson | |
| 5,880,536 A | 3/1999 | Mardirossian | |
| 5,892,431 A | 4/1999 | Osterman | |
| 5,897,766 A | 4/1999 | Kawatsu | |
| 5,901,057 A | 5/1999 | Brand et al. | |
| 5,925,476 A | 7/1999 | Kawatsu | |
| 5,961,604 A | 10/1999 | Anderson et al. | |
| 5,982,645 A | 11/1999 | Levran et al. | |
| 5,982,652 A | 11/1999 | Simonelli et al. | |
| 5,994,793 A | 11/1999 | Bobry | |
| 5,994,794 A | 11/1999 | Wehrlen | |
| 6,011,324 A | 1/2000 | Kohlstruck et al. | |
| 6,014,015 A | 1/2000 | Thorne et al. | |

(56) References Cited

U.S. PATENT DOCUMENTS

| | | | |
|---|---|---|---|
| 6,028,414 A | 2/2000 | Chouinard et al. | |
| 6,069,412 A | 5/2000 | Raddi et al. | |
| 6,100,665 A | 8/2000 | Alderman | |
| 6,198,178 B1 | 3/2001 | Schienbein et al. | |
| 6,212,081 B1 | 4/2001 | Sakai | |
| 6,218,744 B1 * | 4/2001 | Zahrte et al. | 307/64 |
| 6,288,456 B1 | 9/2001 | Cratty | |
| 6,288,916 B1 | 9/2001 | Liu et al. | |
| 6,295,215 B1 | 9/2001 | Faria et al. | |
| 6,348,782 B1 * | 2/2002 | Oughton et al. | 323/284 |
| 6,465,910 B2 | 10/2002 | Young et al. | |
| 6,486,399 B1 | 11/2002 | Armstrong et al. | |
| 6,602,627 B2 | 8/2003 | Liu et al. | |
| 6,841,971 B1 | 1/2005 | Spee et al. | |
| 6,906,933 B2 | 6/2005 | Taimela | |
| 6,933,626 B2 | 8/2005 | Oughton, Jr. | |
| 7,040,920 B2 | 5/2006 | Johnson, Jr. et al. | |
| 7,182,632 B1 | 2/2007 | Johnson, Jr. et al. | |
| 7,449,798 B2 | 11/2008 | Suzuki et al. | |
| 2005/0258927 A1 * | 11/2005 | Lu | 336/234 |
| 2009/0196082 A1 | 8/2009 | Mazumder et al. | |
| 2012/0091811 A1 | 4/2012 | Heidenreich et al. | |
| 2012/0212051 A1 | 8/2012 | Heidenreich et al. | |
| 2012/0217800 A1 | 8/2012 | Heidenreich et al. | |
| 2012/0217806 A1 | 8/2012 | Heidenreich et al. | |
| 2012/0217808 A1 | 8/2012 | Richardson et al. | |

FOREIGN PATENT DOCUMENTS

| | | |
|---|---|---|
| CA | 1297546 | 3/1992 |
| CA | 2086897 | 7/1993 |
| CA | 2028269 | 1/2000 |
| CA | 2403888 | 9/2002 |
| CA | 2713017 | 7/2009 |
| DE | 2602789 | 7/1977 |
| DE | 2809514 | 9/1978 |
| DE | 3321649 | 12/1983 |
| EP | 0284541 | 9/1988 |
| FR | 762789 | 4/1934 |
| FR | 861215 | 2/1941 |
| GB | 260731 | 9/1925 |
| GB | 2005118 | 4/1979 |
| GB | 2120474 | 11/1983 |
| GB | 2137033 | 9/1984 |
| GB | 2171861 | 9/1986 |
| GB | 2185326 | 10/1986 |
| GB | 2355350 | 4/2001 |
| JP | 5482053 | 6/1979 |
| JP | 55032133 | 3/1980 |
| JP | 5650417 | 5/1981 |
| JP | 56155420 | 12/1981 |
| JP | 2000350381 | 12/2000 |
| JP | 2001190035 | 7/2001 |
| JP | 2005295776 | 10/2005 |
| JP | 2010136547 | 6/2010 |
| RU | 2221320 | 10/2004 |
| WO | 8501842 | 4/1985 |

OTHER PUBLICATIONS

Bridge et al., "Preventing outages without batteries", CED, Jun. 1999, 7 pages.
Broadband Business and News Perspective, "Cable operators feeling power surge", Reprinted from CED, Apr. 2000, 4 pages.
Ivensys, "Power When You Really Need It!", Publication No. CSG29FXA, Feb. 2000, 2 pages.
Ivensys, "Sometimes Less Is More!", Publication No. CSG28FXA, Feb. 2000, 2 pages.
Lectro Products Incorporated, "Solving CATV Power Solutions", Publication No. CSG24FYA, Jun. 1999, 12 pages.
Lectro Products Incorporated, "Lectro Ferro Family", Publication No. CSG16FXA, Nov. 1998, 4 pages.
Marcotte, "Power migration strategies for future-proofing", Reprinted from CED Magazine, Jun. 1997, 4 pages.
Marcotte et al., "Powering Cable TV Systems", Reprinted from Broadband Systems & Design, Jun. 1996, 4 pages.
Multipower, Inc., "Confluence Newsletters, vols. I and II", "MP 900", "MP1350", web site http://www.multipowerups.com/index.htm, Aug. 2000, 16 pages.
International Searching Authority, "PCT/US2012/021619", International Search Report, May 17, 2012, 7 pages.
Spears, "Disturbances Can Toast Your System", Reprint from Communications Technology, Apr. 2000, 4 pages.

* cited by examiner

FERRORESONANT TRANSFORMER FOR USE IN UNINTERRUPTIBLE POWER SUPPLIES

RELATED APPLICATIONS

This application, U.S. patent application Ser. No. 12/803,787 filed Jul. 7, 2010, claims priority of U.S. Provisional Patent Application No. 61/305,926 filed Feb. 18, 2010, the contents of which are incorporated herein by reference.

TECHNICAL FIELD

The present invention relates the generation of a standby power signal and, more specifically, to uninterruptible power supply systems and methods using ferroresonant transformers.

BACKGROUND

Uninterruptible power supplies (UPS's) have long been used to provide at least temporary auxiliary power to electronic devices. Typically, a UPS is configured to switch between a primary power source and a standby power source as necessary to maintain constant power to a load.

For example, the primary power source may be a utility power supply, and the standby power source may take the form of a battery system. The UPS will normally operate in a line mode in which the utility power signal is passed to the load when the utility power signal is within predefined parameters. In the line mode, the UPS will typically also charge the battery system. When the utility power falls outside of the predefined parameters, the UPS will switch to standby mode in which an AC signal is generated based on the energy stored in the battery system.

A class of UPS's employs a ferroresonant transformer. A ferroresonant transformer is a saturating transformer that employs a tank circuit comprised of a resonant winding and capacitor to produce a nearly constant average output even if the input to the transformer varies. A typical UPS employing a ferroresonant transformer takes advantage of the voltage regulating properties of a ferroresonant transformer in both line and standby modes. In the context of a UPS, a ferroresonant transformer thus provides surge suppression, isolation, short circuit protection, and to voltage regulation without the use of active components.

Conventionally, a ferroresonant transformer configured for use in a UPS system includes a core and an inductor arranged relative to the core to define: (a) a primary or input side of the transformer and (b) a secondary or output side of the transformer. A conventional ferroresonant transformer used in a UPS will further comprise input windings and inverter (resonant) windings arranged on the primary or input side and output windings on the secondary or output side.

An object of the present invention is to provide improved ferroresonant transformers for use in UPS systems.

SUMMARY

The present invention may be embodied as a ferroresonant transformer comprises a core, a main shunt, first windings, second windings, and third windings. The main shunt arranged relative to the core to define a primary side and a secondary side of the ferroresonant transformer. The first windings are arranged on the primary side of the ferroresonant transformer and are operatively connected to the primary power source. The second windings are arranged on the secondary side of the ferroresonant transformer and are operatively connected to the secondary power source. The third windings are arranged on the secondary side of the ferroresonant transformer and are operatively connected to the resonant capacitor. When a primary signal is present on the first windings, a first output signal is present on at least a portion of the third windings. When a secondary power is present on the second windings, a second output signal is present on at least a portion of the third windings.

The present invention may also be embodied as an uninterruptible power supply for supplying power to a load comprising a transformer, a resonant capacitor, a primary power source, and a secondary power source. The transformer comprises a core, a main shunt arranged relative to the core to define a primary side and a secondary side of the transformer, first windings arranged on the primary side of the transformer, second windings arranged on the secondary side of the transformer, and third windings arranged on the secondary side of the transformer. The resonant capacitor is operatively connected to the third windings. The primary power source is operatively connected to the first windings. The secondary power source is operatively connected to the second windings. The load is connected to at least a portion of the third windings. In a line mode, the primary power source causes a primary signal to be present on the first windings such that a first output signal supplied to the load based on the primary signal. In a standby mode, the secondary power source causes a secondary signal to be present on the second windings such that a second output signal is supplied to the load based on the secondary signal.

The present invention may also be embodied as a method of supplying uninterruptible power to a load comprising the following steps. A main shunt is arranged relative to a core to define a primary side and a secondary side. First windings are arranged on the primary side, while second and third windings are arranged on the secondary side. A resonant capacitor is operatively connected to the third windings. A primary power source is operatively connected to the first windings. A secondary power source is operatively connected to the second windings. The load is operatively connected to at least a portion of the third windings. When operating in a line mode, the primary power source causes a primary signal to be present on the first windings such that a first output signal supplied to the load. When operating in a standby mode, the secondary power source causes a secondary signal to be present on the second windings such that a second output signal is supplied to the load.

DETAILED DESCRIPTION

Figure 1:
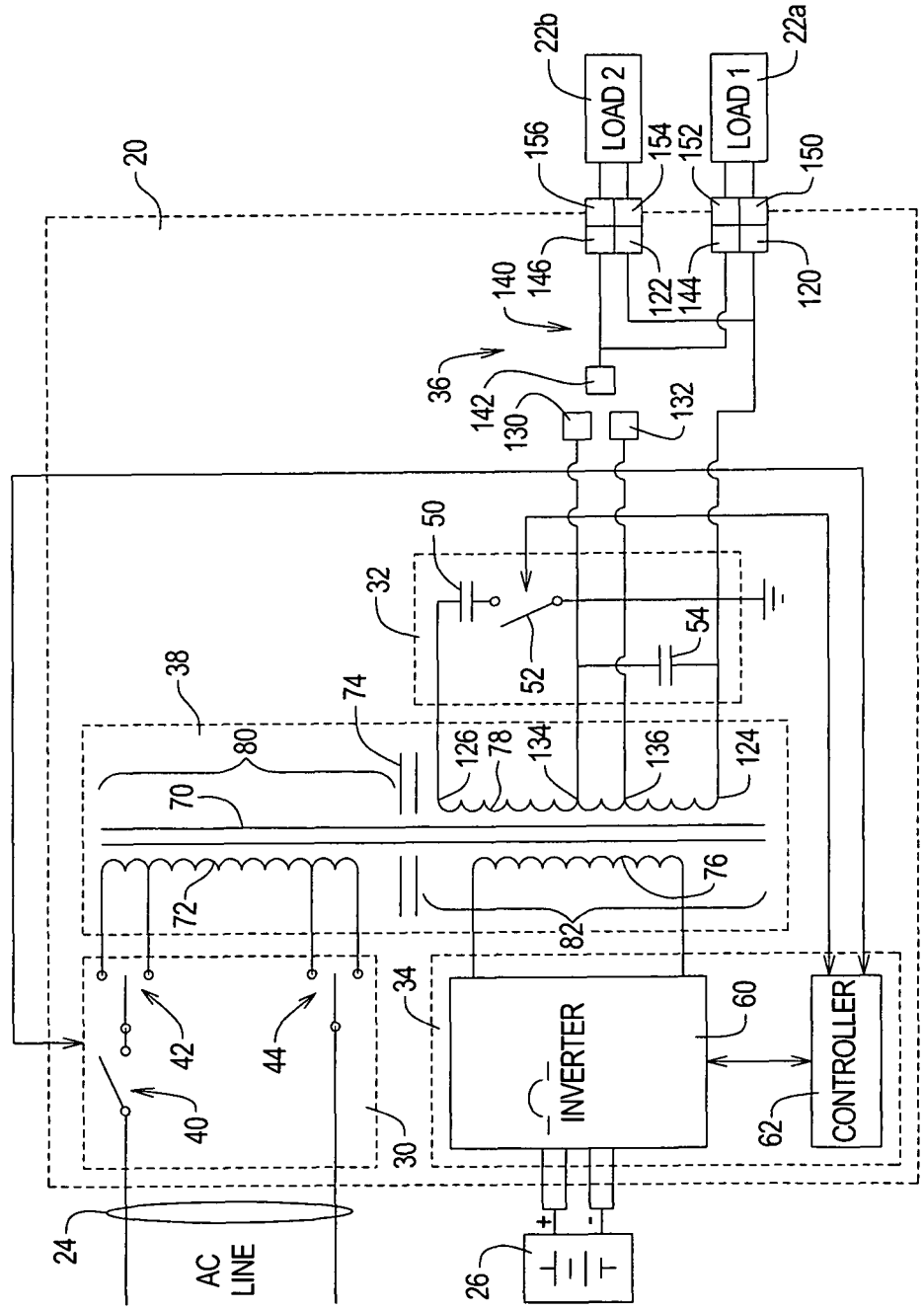
FIG. 1 is a simplified block diagram of a first embodiment of an uninterruptible power supply system using a ferroresonant transformer system constructed in accordance with, and embodying, the principles of the present invention.

Referring initially to FIG. 1 of the drawing, depicted therein is a first example of an uninterruptible power supply (UPS) system 20 constructed in accordance with, and embodying, the principles of the present invention.

The example UPS system 20 supplies power to a load 22 based on a primary power signal present on an AC power line 24 (line mode) or a secondary power signal generated by a battery pack 26 (standby mode). While the example secondary power signal is generated by a battery pack in the example UPS system 20, alternative power sources such as generators, fuel cells, solar cells, and the like may be used as the secondary power source.

The example UPS system 20 comprises an input section 30, an output section 32, an inverter section 34, a cable assembly 36, and a ferroresonant transformer 38.

The example input section 30 comprises a main switch 40 and first and second select switches 42 and 44. The example output section 32 comprises an output or resonant capacitor 50 and, optionally, a select switch 52 and a filter capacitor 54.

When the select switch 52 is closed, the output capacitor 50 forms a resonant or tank circuit with the transformer 38 as will be described in further detail below. When the select switch 52 is open, the output capacitor 50 is removed from the circuit formed by the output section 32 and transformer 38, and the filter capacitor 54 filters the output of this circuit.

The inverter section 34 comprises an inverter circuit 60. The inverter circuit 60 may be an H-bridge circuit or any other circuit capable of producing an appropriate AC power signal based on a DC power signal obtained from the battery pack 26. In particular, the inverter circuit 60 is pulse-width modulated, and the inverter section 34 functions as a switch mode power supply when the UPS system operates in the standby mode. The inverter section 34 and the inverter circuit 60 are or may be conventional and will not be described herein in further detail.

A controller 62 may be optionally included in the inverter section 34. If used, the controller 62 operates the switches 40 and 52 and controls the inverter circuit 60. The controller 62 may further control the charging of the battery pack 26 when the UPS system 20 operates in line mode based on the temperature, voltage, and/or current signals associated with the battery pack 26.

Figure 2:
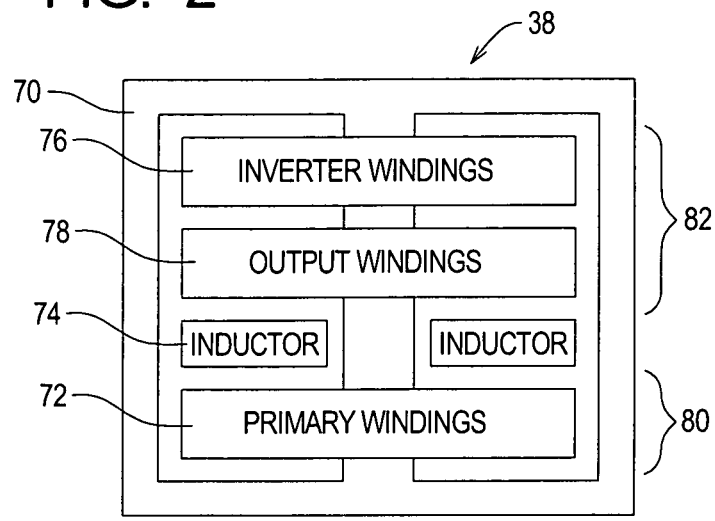
FIG. 2 is a somewhat schematic view of a ferroresonant transformer forming a part of the UPS system depicted in FIG. 1.

The ferroresonant transformer 38 comprises a core 70, input windings 72, an inductor 74, inverter windings 76, and output windings 78. The core 70 is or may be a conventional laminate structure. As shown in FIG. 2, the inductor 74 defines a primary side 80 and a secondary side 82 of the transformer 38. In the example transformer 38, only the input windings 72 are on the primary side 80 of the transformer 38. The inverter windings 76 and output windings 78 are on the secondary side 82 of the transformer 38. In particular, the output windings 78 are arranged between the inverter windings 76 and the inductor 74, and the inductor 74 is arranged between the output windings 78 and the input windings 72.

Figure 3:
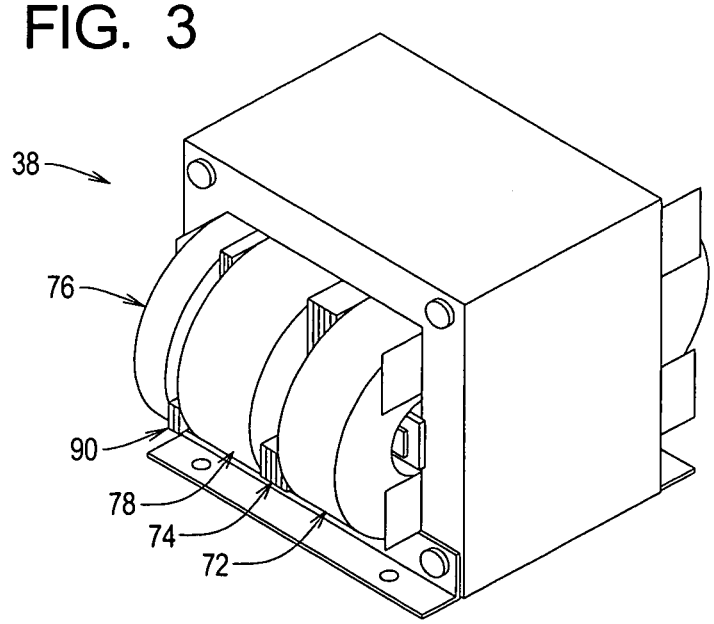
FIG. 3 is a perspective view of the ferroresonant transformer depicted in FIG. 2.
Figure 4:
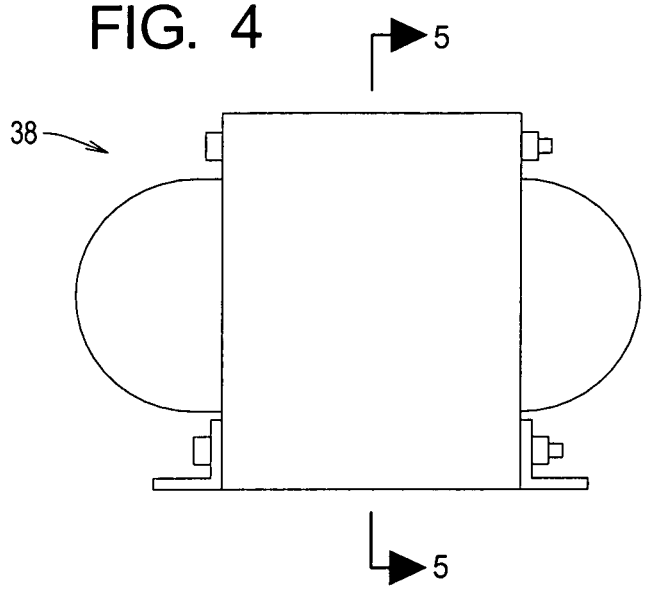
FIG. 4 is a side elevation view of the ferroresonant transformer depicted in FIGS. 2 and 3.
Figure 5:
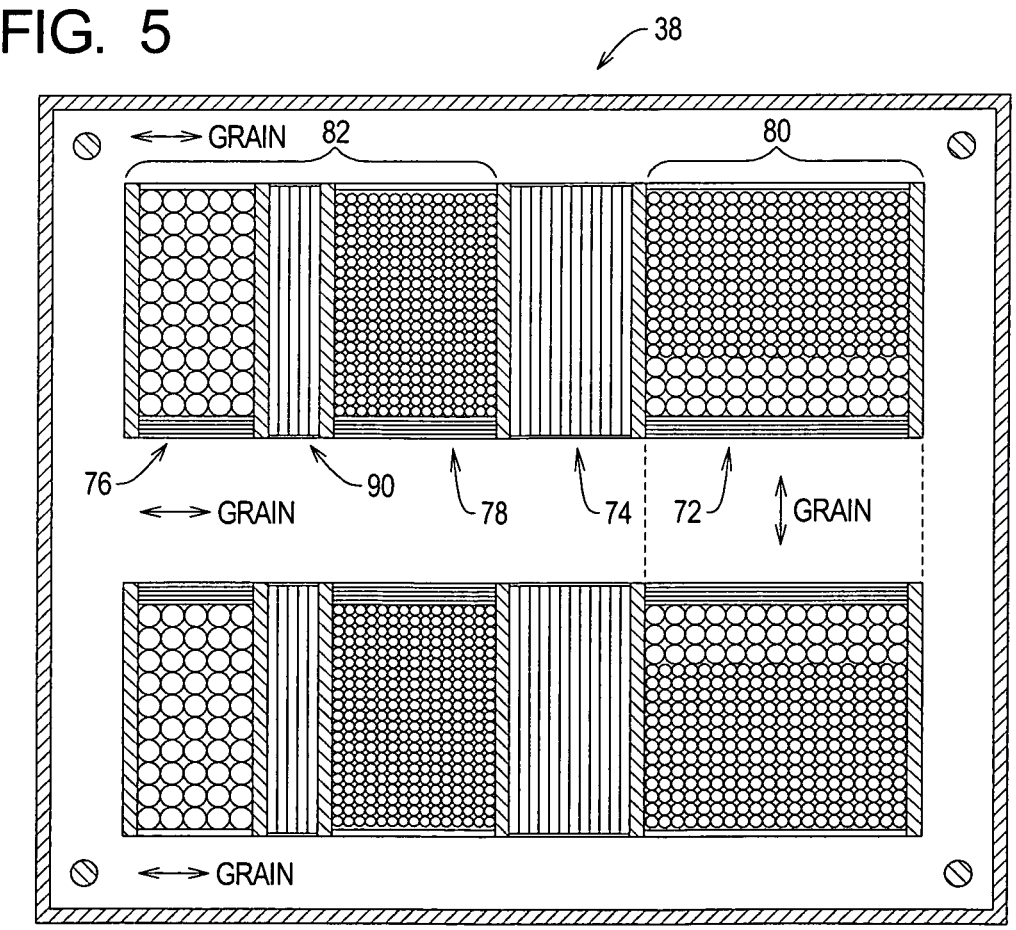
FIG. 5 is a section view taken along lines 5-5 in FIG. 4.

As perhaps best shown in FIGS. 3 and 5, the transformer 38 depicted in FIGS. 1 and 2 defines the following arrangement of windings and shunts: the input windings 72, a large (or main) shunt formed by the inductor 74, output windings 78, and inverter windings 76. FIGS. 3 and 5 further illustrate that, in the example transformer 38, a small (or minor) shunt 90 is arranged between the output windings 78 and the inverter windings 76. The small shunt 90 does not significantly affect the electromagnetic properties of the transformer 38 in the context of the overall UPS system 20 but is used in the example transformer 38 to allow the transformer 38 to operate as described herein in the context of the UPS system 20.

In the line mode, the AC power line 24 forms a primary power source that causes a primary signal to be present on the input windings 72. The input windings 72 are electromagnetically coupled to the output windings 78 such that a first output signal is supplied to one or both of the loads 22a and 22b when the UPS system 20 operates in the line mode.

In the standby mode, the battery pack 26 and inverter section 34 form a secondary power source that causes a secondary signal to be present on the inverter windings 76. The inverter windings 76 are electromagnetically coupled to the output windings 78 such that a second output signal is supplied to one or both of the loads 22a and 22b when the UPS system 20 operates in the standby mode.

The construction details of the transformer 38 are not critical to the general principles of the present invention and will depend upon a particular implementation of the UPS system 20 in which the transformer 38 is designed to operate. The example transformer 38 has the following characteristics:

| | |
|---|---|
| stacking | 3 × 3 interleaved |
| stack height | approximately 109.73 MM (4.32") |
| shunts | positioned in cores such that there is equal overhang on both sides |
| keeper | cut from E lamination at both ends of stack; tape tightly across keeper after E-I compaction to reduce noise |
| lamination | compact E-I lamination together without air gap |
| sleevings | nylon sleevings used with bolts |
| shims | use wood shims to fill in gaps between windings and core |
| small shunt | approximately 2.00 mm (0.075") thick (4 pcs grade H50 or 3 pcs M54 shunt lamination); polyester tape |
| large shunt | approximately 16 mm (0.625") thick (stack height adjusted to meet short circuit current requirement); polyester tape |
| core | E-I lamination; grain orientation as shown in FIG. 3 |
| varnish | penetrate at least 80% of the windings and be fully cured |

The example cable assembly 36 connects the output section 32 to one of first and second example loads 22a or 22b. In particular, the cable assembly 36 comprises first and second winding connectors 120 and 122 operatively connected to a first end 124 of the output windings 78. A second end 126 of the output windings 78 is connected to the output capacitor 50. The cable assembly 36 further comprises first and second tap connectors 130 and 132 operatively connected to first and second intermediate points 134 and 136, respectively, of the output windings 78. The example cable assembly 36 additionally comprises a selection cable 140 comprising a selection connector 142 and first and second output connectors 144 and 146. The first load 22a comprises first and second load connectors 150 and 152, while the second load 22b comprises second and third load connectors 154 and 156.

Using the example cable assembly 36, the selection connector 142 is connected to either the first tap connector 130 or the second tap connector 132 depending upon the voltage requirements of the loads 22a and 22b. The first and third load connectors 150 and 154 are connected to the first and second winding connectors 120 and 122, and the second and fourth winding connectors 152 and 156 are connected to the first and second output connectors 144 and 146, respectively. The cable assembly 36 thus allows one or both of the loads 22a and 22b to be connected to the output section 32 and the output windings 78 and, more specifically, to an appropriate portion of the output windings 78 as determined by the first and second tap connectors 130 and 132. The selection of the appropriate tap connector 130 or 132 is based on the voltage requirements of the loads 22a and 22b.

Given the foregoing, it should be apparent that the principles of the present invention may be embodied in forms other than those described above. The scope of the present invention should thus be determined the claims to be appended hereto and not the foregoing detailed description of the invention.

What is claimed is:

1. A ferroresonant transformer adapted to be connected to a resonant capacitor, a primary power source that generates a primary power signal, and a secondary power source that generates a secondary power signal, the ferroresonant transformer comprising:
   a core;
   a main shunt arranged relative to the core to define a primary side and a secondary side of the ferroresonant transformer;
   first windings arranged on the primary side of the ferroresonant transformer, where the first windings are operatively connected to the primary power source;
   second windings arranged on the secondary side of the ferroresonant transformer, where the second windings are operatively connected to the secondary power source; and
   third windings arranged on the secondary side of the ferroresonant transformer, where the third windings are operatively connected to the resonant capacitor; whereby
   when the primary signal is present on the first windings, a first output signal is present on at least a portion of the third windings; and
   when the secondary power is present on the second windings, a second output signal is present on at least a portion of the third windings.

2. A ferroresonant transformer as recited in claim 1, in which the main shunt is formed by an inductor.

3. A ferroresonant transformer as recited in claim 1, further comprising a minor shunt arranged between the second windings and the third windings.

4. An uninterruptible power supply for supplying power to a load, comprising:
   a transformer comprising
     a core,
     a main shunt arranged relative to the core to define a primary side and a secondary side of the transformer,
     first windings arranged on the primary side of the transformer,
     second windings arranged on the secondary side of the transformer, and
     third windings arranged on the secondary side of the transformer,
   a resonant capacitor operatively connected to the third windings;
   a primary power source operatively connected to the first windings; and
   a secondary power source operatively connected to the second windings; wherein
   the load is connected to at least a portion of the third windings;
   in a line mode, the primary power source causes a primary signal to be present on the first windings such that a first output signal supplied to the load based on the primary signal; and
   in a standby mode, the secondary power source causes a secondary signal to be present on the second windings such that a second output signal is supplied to the load based on the secondary signal.

5. An uninterruptible power supply system as recited in claim 4, in which the main shunt is formed by an inductor.

6. An uninterruptible power supply system as recited in claim 4, in which the transformer further comprises a minor shunt arranged between the second windings and the third windings.

7. An uninterruptible power supply as recited in claim 4, in which the secondary power source comprises a battery pack and an inverter.

8. An uninterruptible power supply as recited in claim 4, in which the secondary power source is a switch mode power supply.

9. An uninterruptible power supply as recited in claim 7, in which the inverter circuit comprises an H-bridge.

10. A method of supplying uninterruptible power to a load, comprising the steps:
    providing a core;
    arranging a main shunt relative to the core to define a primary side and a secondary side;
    arranging first windings arranged on the primary side;
    arranging second windings on the secondary side;
    arranging third windings on the secondary side;
    operatively connecting a resonant capacitor to the third windings;
    operatively connecting a primary power source to the first windings;
    operatively connecting a secondary power source to the second windings;
    operatively connecting the load to at least a portion of the third windings;
    operating in one of a line mode or a standby mode, whereby
      when operating in the line mode, the primary power source causes a primary signal to be present on the first windings such that a first output signal supplied to the load; and
      when operating in the standby mode, the secondary power source causes a secondary signal to be present on the second windings such that a second output signal is supplied to the load.

11. A method as recited in claim 10, further comprising the step of arranging a minor shunt between the second windings and the third windings relative to the core.

12. A method as recited in claim 10, in which the step of operatively connecting the secondary power source to the second windings comprises the steps of providing a battery pack and providing an inverter.

13. A method as recited in claim 10, in which the step of operatively connecting the secondary power source to the second windings comprises the step of providing a switch mode power supply.

14. A method as recited in claim 10, in which the step of providing the inverter comprises the step of providing an H-bridge.

* * * * *